(12) United States Patent
Cummins et al.

(10) Patent No.: US 11,660,872 B2
(45) Date of Patent: May 30, 2023

(54) FOOD PRODUCT PRINTER

(71) Applicant: Primera Technology, Inc., Plymouth, MN (US)

(72) Inventors: Robert P. Cummins, Deephaven, MN (US); Todd Britz, Maple Grove, MN (US); Erick Hagstrom, Wayzata, MN (US)

(73) Assignee: PRIMERA TECHNOLOGY, INC., Plymouth, MN (US)

( * ) Notice: Subject to any disclaimer, the term of this patent is extended or adjusted under 35 U.S.C. 154(b) by 384 days.

(21) Appl. No.: 17/004,674

(22) Filed: Aug. 27, 2020

(65) Prior Publication Data
US 2021/0060973 A1 Mar. 4, 2021

Related U.S. Application Data

(60) Provisional application No. 62/894,323, filed on Aug. 30, 2019.

(51) Int. Cl.
*B41J 3/407* (2006.01)
*B41J 2/175* (2006.01)
(Continued)

(52) U.S. Cl.
CPC .......... *B41J 2/17563* (2013.01); *A21D 13/24* (2017.01); *A21D 13/80* (2017.01); *A23P 20/18* (2016.08);
(Continued)

(58) Field of Classification Search
CPC .... B41J 2/17563; B41J 2/1714; B41J 2/1721; B41J 3/407; B41J 3/4073; B41J 3/40731;
(Continued)

(56) References Cited

U.S. PATENT DOCUMENTS 4,339,993 A * 7/1982 Lee ...................... A47J 37/046
99/373
4,981,074 A 1/1991 Machita et al.
(Continued)

FOREIGN PATENT DOCUMENTS

CN 1868754 A 11/2006
CN 201325212 Y 10/2009
(Continued)

OTHER PUBLICATIONS

International Search Report issued for PCT/US2020/048406, dated Nov. 26, 2020.
(Continued)

*Primary Examiner* — Scott A Richmond
(74) *Attorney, Agent, or Firm* — Westman, Champlin & Koehler, P.A.; Z. Peter Sawicki; Amanda M. Prose (57) ABSTRACT

A printer and corresponding method of printing an image on a surface of a plurality of food products by providing a system having a printer with an extendable and retractable receiving arm and a rotating food product delivery tray for continuously and automatically providing delivery of unprinted food products which are retracted into the printer, printed on, and returned by the receiving arm to the rotatable delivery tray and the tray further moves to deliver subsequent food products for printing.

11 Claims, 7 Drawing Sheets

(51) Int. Cl.
*B41J 2/17* (2006.01)
*A23P 20/18* (2016.01)
*B41J 29/02* (2006.01)
*A23P 20/20* (2016.01)
*B41J 13/00* (2006.01)
*B41M 5/00* (2006.01)
*A21D 13/80* (2017.01)
*A21D 13/24* (2017.01)
*B41J 29/17* (2006.01)
*A23P 20/25* (2016.01)

(52) U.S. Cl.
CPC .............. *A23P 20/20* (2016.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(58) Field of Classification Search
CPC ........ B41J 13/0009; B41J 29/02; B41J 29/17; B41J 29/13; A21D 13/24; A21D 13/80; A21D 13/47; A23P 20/18; A23P 20/20; A23P 2020/253; B41M 5/0041; B41M 5/0047; A21C 15/002; A23G 3/28
See application file for complete search history.

(56) References Cited

U.S. PATENT DOCUMENTS

| | | | |
|---|---|---|---|
| 5,505,775 | A | 4/1996 | Kitos |
| 5,795,395 | A | 8/1998 | Ben-Matityhu et al. |
| 5,988,787 | A | 11/1999 | Watanabe et al. |
| 2004/0114192 | A1 | 6/2004 | Jensen |
| 2006/0119628 | A1* | 6/2006 | Kofman .................. A23G 9/24 347/2 |
| 2009/0021548 | A1 | 1/2009 | Suzuki et al. |
| 2011/0025735 | A1 | 2/2011 | Nohilly et al. |
| 2012/0141636 | A1 | 6/2012 | Ackley, Jr. et al. |

FOREIGN PATENT DOCUMENTS

| | | |
|---|---|---|
| CN | 105346266 A | 2/2016 |
| CN | 207128411 U | 3/2018 |
| JP | 5346728 A | 12/1993 |
| JP | 2005327918 A | 11/2005 |
| JP | 2007136729 A | 6/2007 |
| JP | 2013078894 A | 5/2013 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.
European Search Report issued for EP20856501.0, dated Jul. 27, 2022.

* cited by examiner

FOOD PRODUCT PRINTER

CROSS-REFERENCE TO RELATED APPLICATION

The present application claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, can be printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food product with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food product for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to a printing system for printing images or content with edible ink on a surface of an edible food product. The edible food product printer of the present disclosure allows a user to print edible ink directly on food products at both low and higher volumes of food products. Moreover, the system includes a delivery tray that is external to a print window of the printer and is spaced apart from the path of the print head. The delivery tray is also stationary during the printing of food products but is configured to automatically and continuously deliver unprinted food products and receive printed food products such that the system is easy to reload with additional unprinted food products for printing and the process is open and visible for viewing and inspection, including for entertainment related to watching a printing process.

Another aspect of the present disclosure relates to a system for printing on a surface of a plurality of food products. The system includes a printer having a receiving arm that is extendable and retractable across a path of a print head of the printer and where the receiving arm is positioned to extend from the printer and retract into the printer to receive one of the plurality of food products and deliver one of the plurality of food products to a position below the print head and to return the one of the plurality of food products after the food product has been printed on. The system further includes a delivery tray spaced apart from the printer and having a plurality of surfaces spaced apart on the delivery tray where each surface is configured for supporting one of the plurality of food products thereon.

In another aspect of the present disclosure the delivery tray is configured to move in synch with the extension and retraction of the receiving arm to automatically deliver each one of the plurality of food products to the receiving arm in a sequential manner for printing on the food product and for receiving the returned printed food products for removal from the printer.

In one or more embodiments, a base is provided for operably supporting the delivery tray in a position spaced apart from the printer.

In one or more embodiments, the surfaces of the delivery tray have one or more support sides for holding one or more sides of the food product and an opening therebetween for receiving an end of the receiving arm therebetween.

In one or more embodiments, to facilitate delivery and return of food products between the print head and the delivery tray, the receiving arm is further configured to raise and/or lower such that a receiving surface of the arm is positionable in the opening. Raising the receiving arm allows for transfer of the food product from the delivery tray to the receiving arm and conversely, when the receiving arm returns the printed food product, the lowering of the receiving arm also drops the printed food product off on to the delivery tray. Additionally, or alternatively, the delivery tray can be raised and/or lowered for purposes of transferring the food product between the receiving arm and the delivery tray.

In one or more embodiments, the surfaces have a positioning mechanism configured to guide the loading of each one of the plurality of food products onto the delivery tray.

In one or more embodiments, the delivery tray is constructed from a material comprising a metal such as stainless steel, or a plastic material and wherein the receiving arm is comprised of the same or a different material than the delivery tray.

In one or more embodiments, the materials are food grade and have met all criteria to be deemed safe for food preparation, storage, and dining.

In one or more embodiments, the plurality of food products are edible elements having a substantially flat surface, cookies, frosting sheets, rice paper, or combinations thereof.

In one or more embodiments, the system is configured to automatically and continuously deliver food products to the receiving arm for printing and receiving printed food products from the receiving arm after printing wherein the system prints pre-selected content on one of the plurality of food products at a time.

In one or more embodiments, movement of the delivery tray is synchronized with the extension and retraction of the receiving arm such that the delivery tray advances when the receiving arm is extended, extending, retracted or retracting and is stationary or lowered when the receiving arm is fully extended. The receiving arm may be fully extended and ready to receive a subsequent food product from the delivery tray as the delivery tray moves.

In yet another aspect of the present disclosure, a method of automatically printing a selected plurality of food products includes loading at least one food product on to a support surface of a delivery tray spaced apart from a printer; extending a receiving arm supported by the printer towards the delivery tray for removing at least one food product from a first support surface of the delivery tray; and retracting the receiving arm into the printer for positioning the food product below a print head of the printer. Once positioned, printing content directly on a surface of the food product can occur and extending the receiving arm supported by the printer towards the delivery tray allows for returning at least one food product to the delivery tray after printing.

The method may be carried out continuously such that extending the receiving arm towards the delivery tray for removing the second food product from the second support surface of the delivery tray and retracting the receiving arm into the printer for positioning the second food product below a print head of the printer can be carried out a predetermined number of times. After printing content directly on a surface of the second food product and extending the receiving arm towards the delivery tray for returning the second food product to the delivery tray, the delivery tray is then moved to deliver a subsequent food product to the receiving arm. The receiving arm can maintain the extended position as the delivery tray moves to the next food product for delivery by advancing the delivery tray to a third support surface of the delivery tray supporting a third food product continues the process.

The receiving arm may also be raised and lowered when the receiving arm is extended for purposes of ensuring delivery of unprinted food products and return of printed food products, respectively between the print head and the delivery tray.

DETAILED DESCRIPTION

A food product printing system of the present disclosure includes a printer system for printing an image on a surface of the food product. The print surface may be an actual surface of the food product itself. The printer system comprises a printer having a receiving arm and a delivery tray supported on a base. The system may also be provided with a plurality of different delivery trays, each tray configured for continuous delivery of a varied number of food products, and/or for food products of different or specific dimensions.

The receiving arm is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions in order to continuously and automatically deliver a plurality of food products sequentially to the receiving arm.

One embodiment of the printing system 10 is illustrated generally in FIGS. 1-7. The printing system 10 is configured to receive a food product 12 from a delivery tray 22, to print on a surface of the food product 12 and return the food product 12 to the delivery tray 22. The system is also configured to do so automatically and continuously for a pre-determined number of food products 12. The system 10 comprises a printer 14 having a print head 16 and nozzles (not shown) wherein the print head 16 and nozzle are configured for printing with edible ink. The print head 16 can be a carriage for an ink cartridge where the ink cartridge may be filled with edible printer ink. The printer 14 also supports an extendable and retractable receiving arm 20 therein.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products.

In further detail, the receiving arm 20 moves in a direction perpendicular to the print head path such that the receiving arm 20 extends and retracts across or through the path of the print head 16 as illustrated by arrows 18. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended.

Once loaded, the receiving arm 20 is then retracted to the printing position with the food product 12 thereon. This process continues on continuously and automatically per a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food products 12.

The delivery tray 22 is configured with a plurality of holders 26 as described in further detail below. Each holder 26 is configured to receive and support a food product 12 and deliver said food product 12 to the receiving arm 20. The delivery tray 22 illustrated herein includes twelve (12) of holders 26, however, trays for holding fewer or more food products are contemplated and within the scope of this disclosure. The number of holders on a tray may be adjusted based on the type or size of item being printed.

Figure 1:
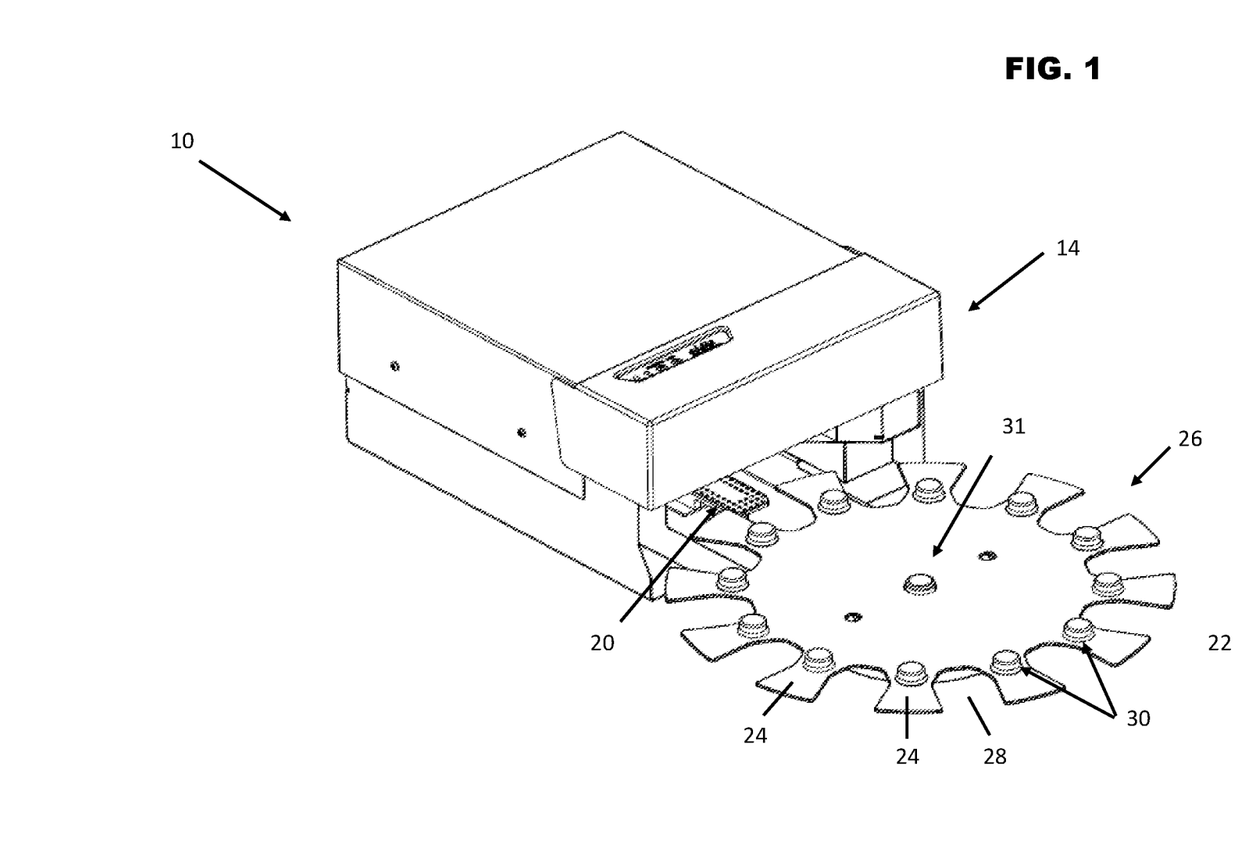
FIG. 1 is a perspective view of a food product printing system.
Figure 2:
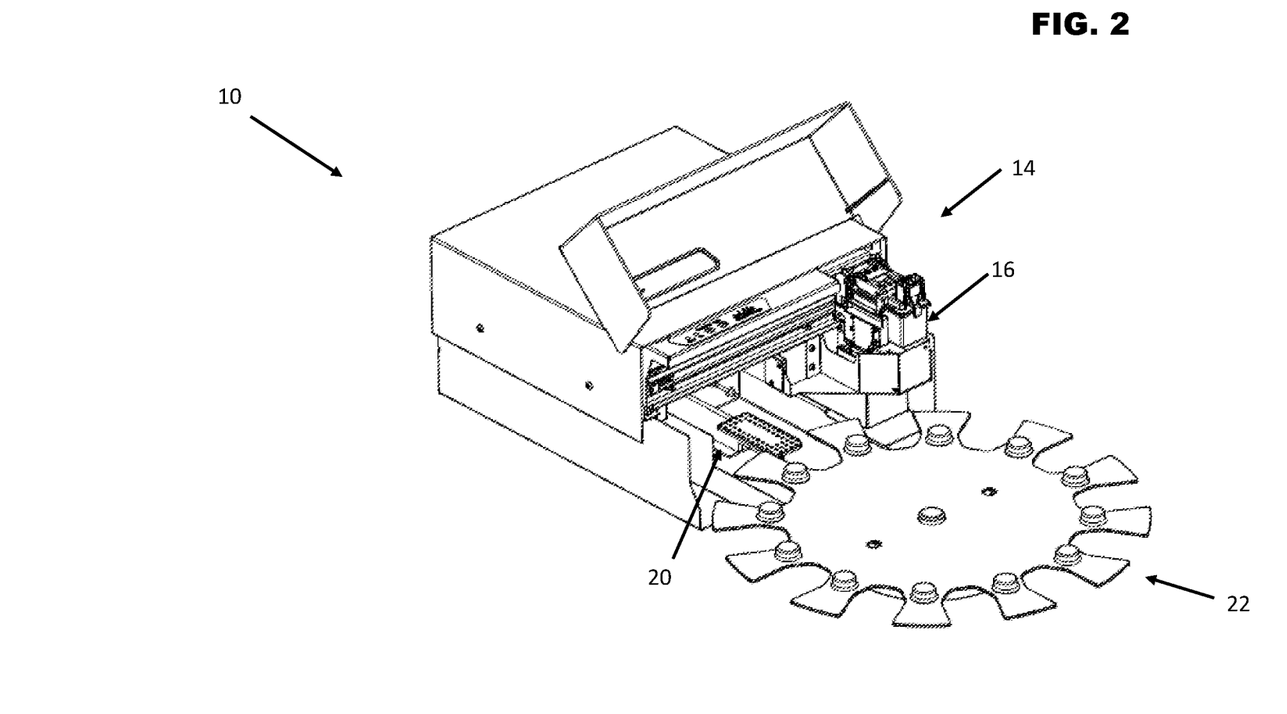
FIG. 2 is a perspective view of a food product printing system with a cover portion opened for exposing interior portions of a printer portion of the system.
Figure 3:
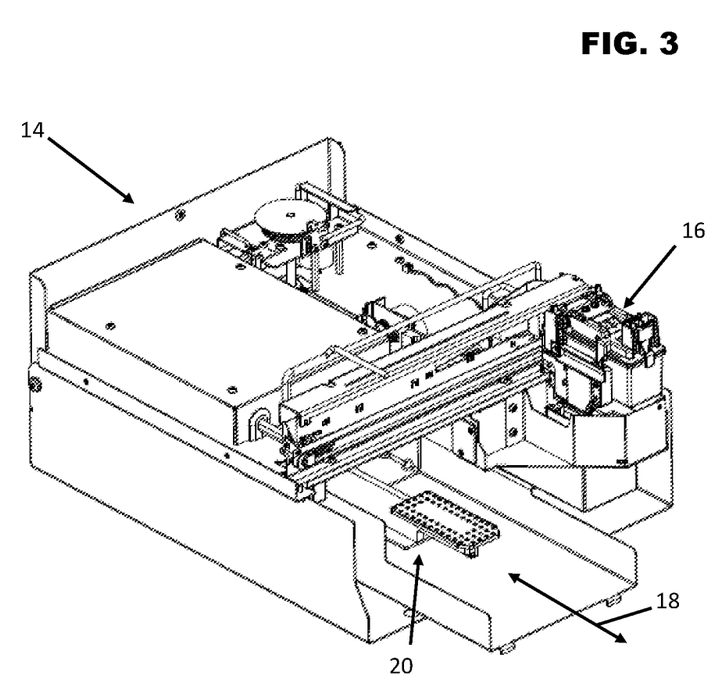
FIG. 3 is a top perspective view of the food product printing system having an automatic delivery tray component removed and a cover of a printer removed.
Figure 4:
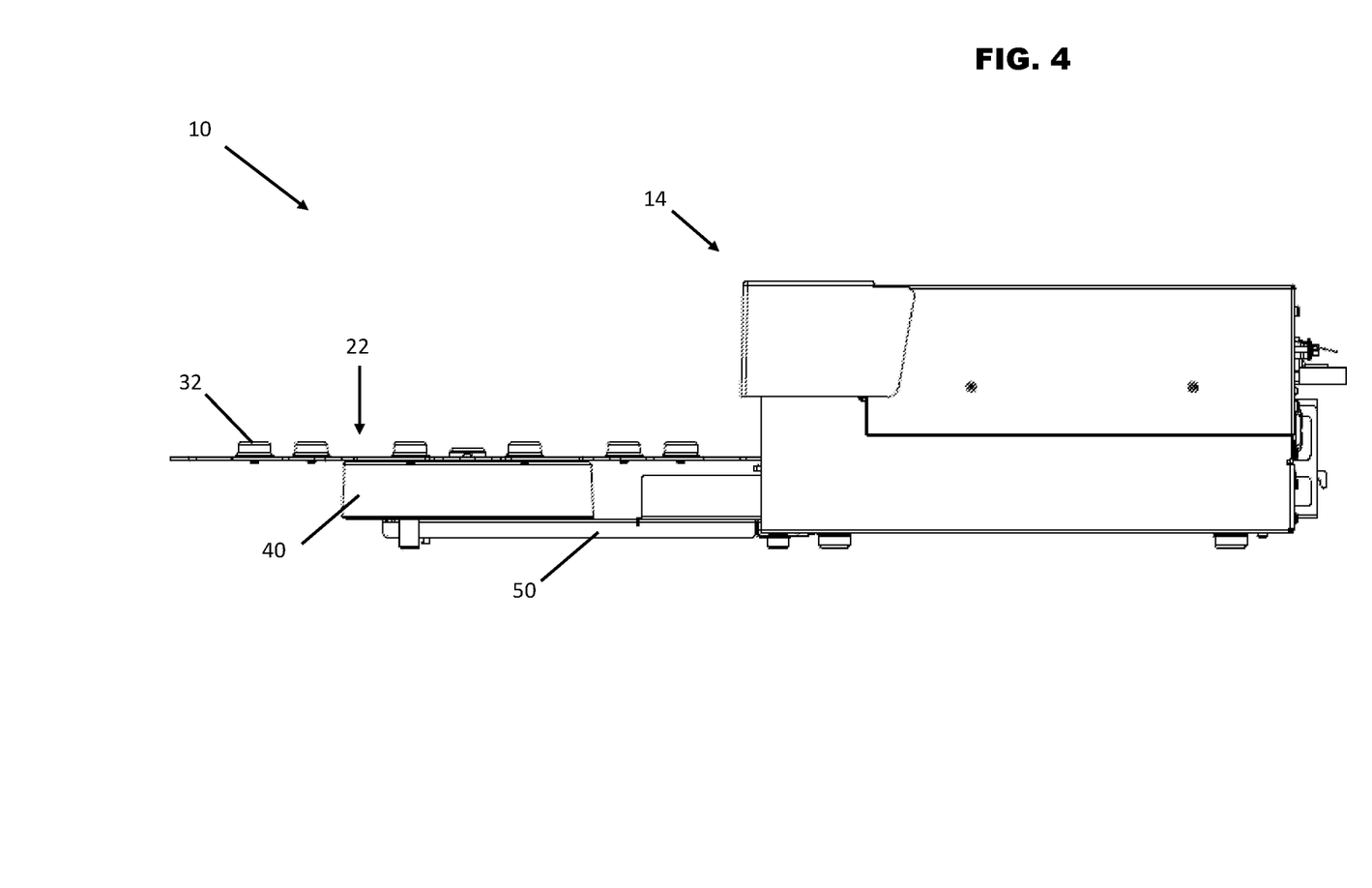
FIG. 4 is a side view of the food product printing system with the automatic delivery tray component removably secured to a tray base portion.
Figure 5:
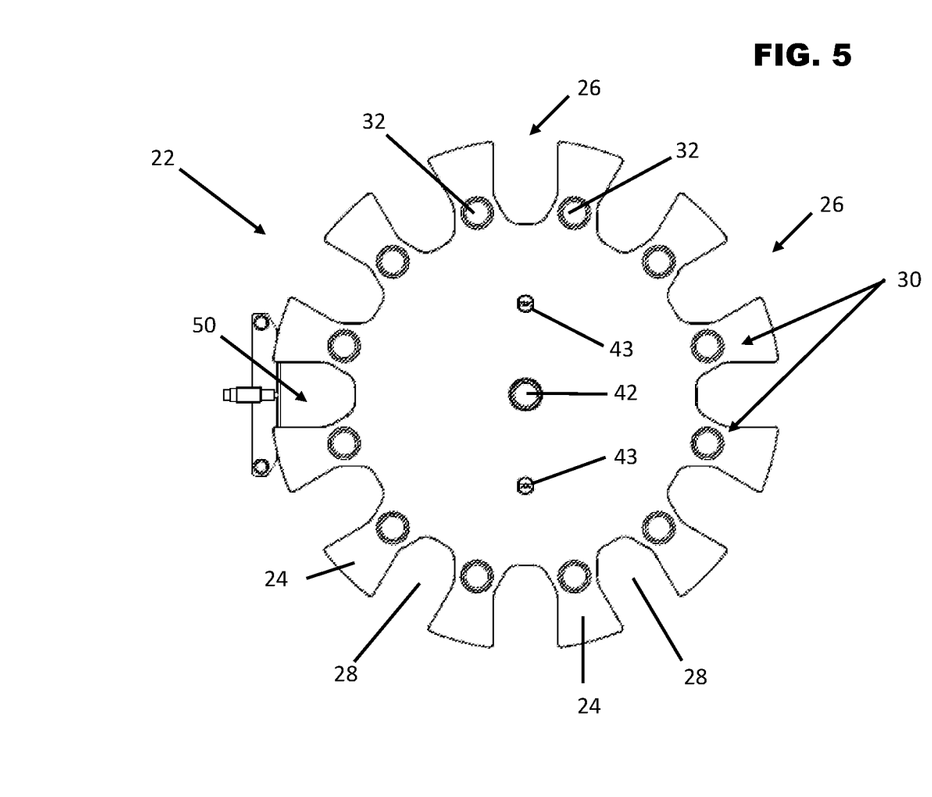
FIG. 5 is a top view of the delivery tray.

Referring to FIG. 5, in one embodiment, each holder 26 has two support sides 24 extending from a center 28 of the tray 22 and an opening 28 between these support sides 24. The food product is supported on the holder by way of resting on top of the two support sides 24 of the holder. The opening 28 between the sides 24 of the holder 26 is configured to receive the receiving arm 20 therein and allows for the receiving arm 20 to take a position for receiving and returning the food product to the delivery tray 22. That is, the receiving arm 20 can extend into this opening 28 and contact a bottom surface of the food product 12 that is supported on the sides 24 of each of the holders 26. The receiving arm 20 then also supports the food product 12 thereon when retracting the food product 12 into the position for printing.

Each holder 26 is configured to support or otherwise hold one or more sides, edges or perimeter lengths of the food product 12 via contact of the support sides 24 with the bottom surface of the food product 12. The holders 26 may have one or more positioning mechanisms 30 for directing a position of the food product 12 when loaded onto the delivery tray 22. Positioning mechanisms 30 are provided, for example, on each of the support sides 24. Utilizing the positioning mechanisms 30 to set the position of the food product 12 during loading of the delivery tray 22 ensures delivery of the food product 12 to the receiving arm 20 such that the food product is balanced on and supported by the receiving arm 20 and ensures the surface of the food product is centered for printing of the content on the food product.

The positioning mechanisms 30 each include a pair of pegs 32 protruding upwardly from the tray 22 and configured to mark the placement location for a round food product 12 on the delivery tray 22. Each one of the pair of pegs 32 protrudes from a location on a corresponding one of the support sides 24 of each holder 26. A forward surface of the food product 12 contacts the pegs 32 to ensure sufficient placement for delivery to the receiving arm 20 when the food product 12 is placed on the holder 26. The holders 26 may have dimensions which allow the position of the food product 12 to be loaded onto the tray 22 in a known position. When the food product 12 is delivered to the receiving arm 20, the position of the food product 12 print surface with respect to the print head 16 can be known when the receiving arm 20 is retracted. In some embodiments, this allows for the elimination of sensors or other position or item detecting means and eliminates other delays due to location or position detection before printing. Instead, upon retraction of the receiving arm 20, printing can begin and the automated process can proceed continuously and efficiently at an increased speed.

Figure 6:
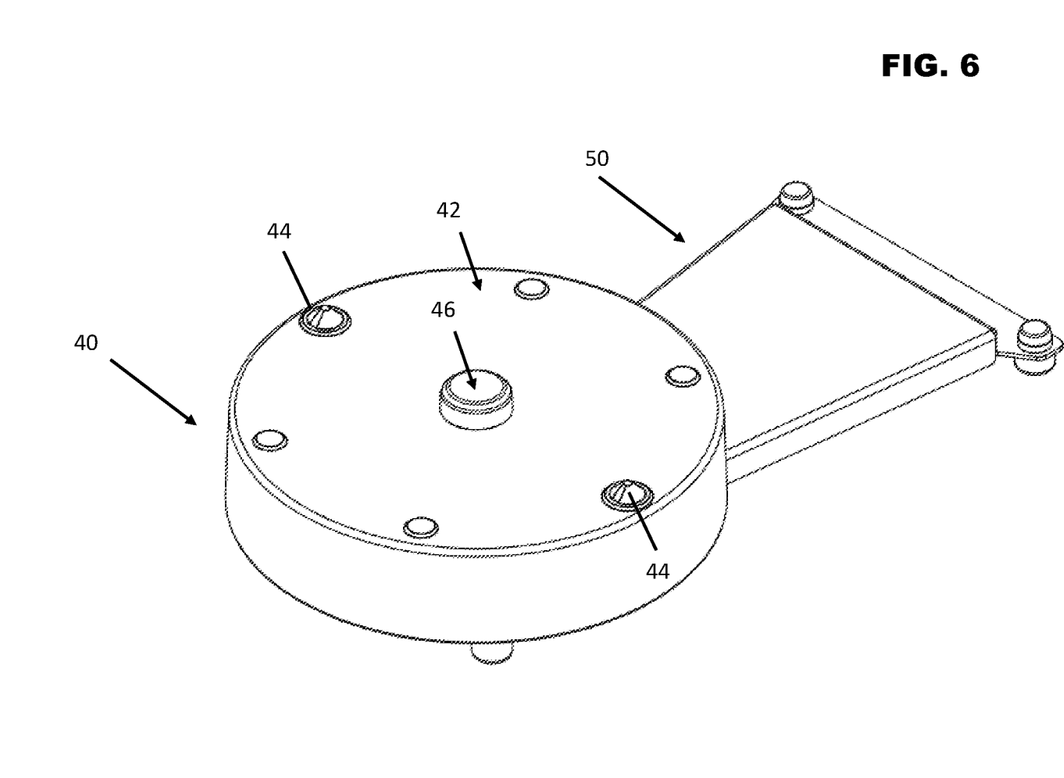
FIG. 6 is a perspective view of the tray base portion.
Figure 7:
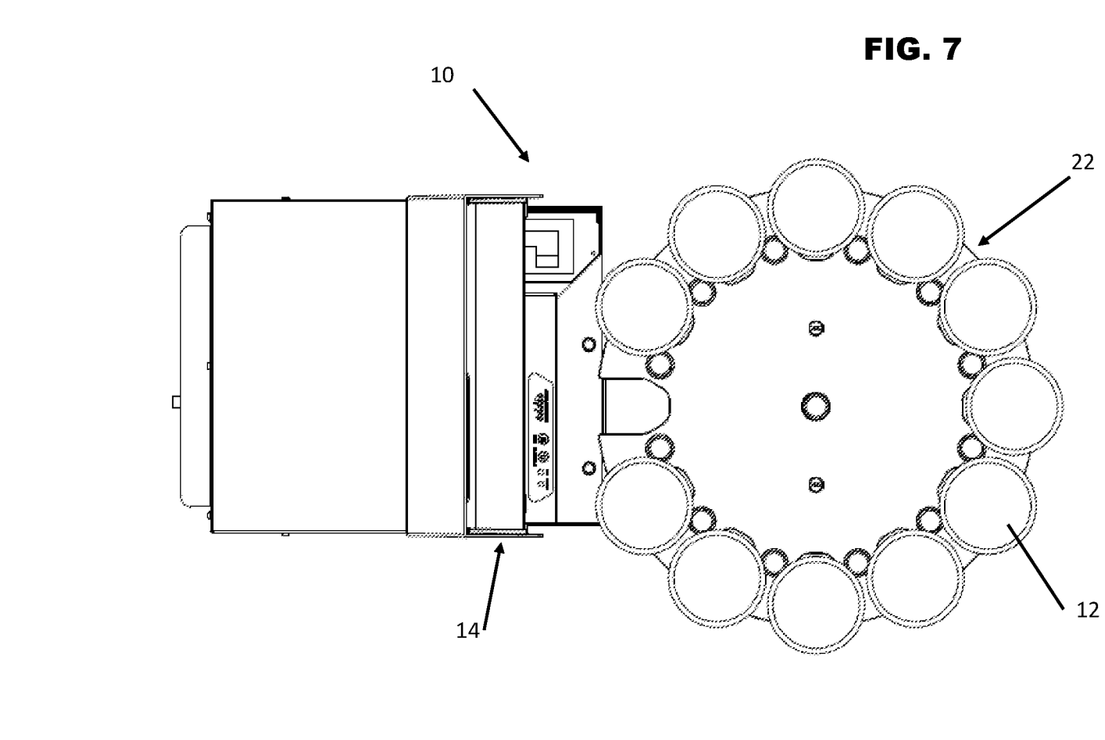
FIG. 7 is a top view of the food product printing system with food product for printing loaded thereon.

As illustrated in FIG. 6, positioned near the printing system is a base 40 for providing power and controlling advancement and vertical positioning of the delivery tray 22. The base 40 is spaced apart from the printer 14 and may be removably connected to the printer 40 via a stabilization arm 50 that extends from a housing of the base 40 to removable connection or coupling to a housing of the printer 14. The arm 50 also positions the base 40 at an adjustable distance from the printer 14, and thus the receiving arm 20, so as to accommodate the delivery tray 22 supported thereon in a manner to cooperate with the receiving arm 20. The base 40 may also be operably connected to the controller and to the power supply of the printer 14 so as to control movement of the tray 22 in a manner synchronized with the printer 14.

The base 40 is configured with one or more mechanisms for operably engaging and supporting the tray 22 thereon. In one embodiment, the base 40 comprises one or more drive posts 44 and a centering pin 46, which allow for placing the delivery tray 22 thereon as the tray comprises reciprocal mechanisms for mating with the drive posts 44 and centering pin 46. This system allows various delivery trays 22 of different dimensions and arrangements for holding food products 12 to moveably connect with the base 40. While the above interface between the tray 22 and base 40 is described, alternative interfaces and non-locking mechanisms for transferring movement generated at the base 40 to the tray 22 for controlled advancement of the delivery tray 22 are contemplated.

The base 40 has a rotatable element 42, such as a housing cover or plate 42 which supports the drive posts 44 and locating pin 46. The base 40 then transfers motion to the delivery tray 22 to advance the position of the tray 22 about the openings 28. The base 40 can be controlled such that the delivery tray 22 advances from one opening 28 to the next adjacent opening 28 automatically after a food product 12 has been returned to the tray 22 from the printer 14 by the receiving arm 20, for example.

The delivery tray 22 and base 40 may be a carousel for continuous delivery, loading and reloading of unprinted food products after printed food products have been returned to the delivery tray 22 and subsequently removed. While a rotatable tray is illustrated herein, the delivery tray 22 may also be linearly advanced, move in multiple directions, or move in the manner of a conveyor belt, by way of non-limiting examples. That is, once printed and returned to the delivery tray 22 as the delivery tray 22 advances to the next adjacent opening 28 for purposes of delivering one or more subsequent food products 12 to the printer 14, the printed and advanced food product may be removed and a new unprinted food product 12 placed on the tray 22. Thus, delivery of unprinted food products and receipt of said food products after printing can be essentially endless, limited only by supply or selection of a predetermined amount to be printed, for example.

The base 40 may comprise its own power source for providing rotational power to the rotatable plate 42 or the base 40 may be operably connected to the power source of the printer system 10. The base 40 is also in communication with the controller (not shown) which controls extension and retraction of the receiving arm 20 and printing of an image on a received food product 12 such that the rotation of the delivery tray is synchronized with the extension and/or retraction of the receiving arm 20.

In the embodiment illustrated, the base 40 provides the power to rotate the delivery tray 22 between various positions which include alignment of a first and one or more subsequent openings 28 with the extended receiving arm 20 as well as rotating the delivery tray 22 to advance the delivery tray 22 to a next opening 28 while the receiving arm 20 is extended. In embodiments where the delivery tray 22 may be in one of two positions, the raised or lowered position, depending on whether an item is to be delivered or returned to the tray 22 and to prevent the receiving arm 20 from interfering with advancing or rotation of the delivery tray 22, the base 40 then also allows for moving the delivery tray 22 between the two positions and thus is configured to raise and lower the tray or tilt the tray 22 upwardly or downwardly at the opening 28 positioned for delivery or return of the food product 12. In such an embodiment, as the receiving arm 20 is extended and positioned in the opening 28, the upper surface of the receiving arm 20 may be substantially level to the top surface of the delivery tray 22. To ensure or facilitate delivery of the food product 12 supported on the delivery tray 22, the delivery tray 22 is downwardly tilted or lowered in the direction of the receiving arm 20. This allows the receiving arm 20 to contact and support a bottom surface of the food product 12 and remove support by the delivery tray 22 thereby transferring the food product 12 to the receiving arm 20. Conversely, when the receiving arm 20 is returning a food product after printing thereon, the delivery tray 22 may be provided in a lowered position and then tilted upwardly or raised after the receiving arm 20 supporting the printed-on food product 12 is extended into the opening 28. This allows the holder 26 to lift the food product off the receiving arm 20 for removal from the printing queue.

In the illustrated embodiment the food item or product 12 is a bakery item such as a cookie. However, while examples of food products or items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilizing in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A system for printing on a surface of a plurality of food products, the system comprising:
a printer;
a receiving arm supported by the printer and extendable and retractable across a path of a print head of the printer and positioned to extend from the printer and retract into the printer to receive one of the plurality of food products and deliver one of the plurality of food products to a position below the print head and to return the one of the plurality of food products after the food product has been printed on;
a delivery tray spaced apart from the printer and having a plurality of surfaces spaced apart on the delivery tray and each surface configured for supporting one of the plurality of food products thereon wherein the delivery tray is configured to move in synch with the extension and retraction of the receiving arm to automatically deliver each one of the plurality of food products to the receiving arm in a sequential manner for printing on the food product and for receiving the returned printed food products for removal from the printer.

2. The system of claim 1, and further comprising a base for operably supporting the delivery tray in a position spaced apart from the printer.

3. The system of claim 2, wherein the delivery tray is a rotatable delivery tray.

4. The system of claim 2, wherein movement of the delivery tray is synchronized with the extension and retraction of the receiving arm.

5. The system of claim 1, wherein the surfaces of the delivery tray have one or more support sides for holding one or more sides of the food product and an opening therebetween for receiving an end of the receiving arm therebetween.

6. The system of claim 5, wherein the surfaces further comprises a positioning mechanism configured to guide the loading of each one of the plurality of food products onto the delivery tray.

7. The system of claim 1, wherein the receiving arm is configured to move between and raised and a lowered position such that the receiving arm can be raised or lowered within the delivery tray opening in order to deliver or retrieve the food product with respect to the delivery tray.

8. The system of claim 1, wherein the delivery tray is constructed from a material comprising a metal such as stainless steel, or a plastic material and wherein the receiving arm is comprised of the same or a different material than the delivery tray.

9. The system of claim 1, wherein the delivery tray is constructed from a food grade material comprising a metal such as stainless steel, or a plastic material and wherein the receiving arm is comprised of the same or a different food grade material than the delivery tray.

10. The system of claim 1, wherein the plurality of food products are edible elements having a substantially flat surface, cookies, frosting sheets, rice paper, or combinations thereof.

11. The system of claim 1, wherein the system is configured to automatically and continuously deliver food products to a print head of the printer via cooperation of the receiving arm and delivery tray and wherein the system prints pre-selected content on one of the plurality of food products at a time.

* * * * *